(12) United States Patent  
Ishigaki et al.

(10) Patent No.: US 8,281,260 B2  
(45) Date of Patent: Oct. 2, 2012

(54) INFORMATION PROCESSING APPARATUS, PROGRAM, AND INFORMATION PROCESSING METHOD

(75) Inventors: Satoru Ishigaki, Ome (JP); Toshifumi Ootake, Ome (JP); Kei Sakamoto, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 389 days.

(21) Appl. No.: 12/191,576

(22) Filed: Aug. 14, 2008

(65) Prior Publication Data

US 2009/0064054 A1 Mar. 5, 2009

(30) Foreign Application Priority Data

Aug. 30, 2007 (JP) ................................ 2007-224369

(51) Int. Cl.  
*G06F 3/048* (2006.01)
(52) U.S. Cl. ........ 715/856; 715/857; 715/858; 715/862; 715/863; 345/157; 345/158; 345/159
(58) Field of Classification Search .......... 715/856–863; 345/157–159  
See application file for complete search history.

(56) References Cited

U.S. PATENT DOCUMENTS

| | | | | |
|---|---|---|---|---|
| 5,594,469 | A * | 1/1997 | Freeman et al. | 345/158 |
| 6,226,409 | B1 * | 5/2001 | Cham et al. | 382/228 |
| 7,565,295 | B1 * | 7/2009 | Hernandez-Rebollar | 704/271 |
| 2002/0064382 | A1 * | 5/2002 | Hildreth et al. | 396/100 |
| 2002/0151992 | A1 * | 10/2002 | Hoffberg et al. | 700/83 |
| 2003/0103647 | A1 * | 6/2003 | Rui et al. | 382/103 |
| 2003/0146901 | A1 * | 8/2003 | Ryan | 345/158 |
| 2004/0052418 | A1 * | 3/2004 | DeLean | 382/209 |
| 2006/0010400 | A1 * | 1/2006 | Dehlin et al. | 715/856 |
| 2006/0132435 | A1 * | 6/2006 | Machida | 345/157 |
| 2006/0284837 | A1 * | 12/2006 | Stenger et al. | 345/156 |
| 2007/0211022 | A1 * | 9/2007 | Boillot | 345/156 |
| 2007/0268269 | A1 * | 11/2007 | Chang et al. | 345/173 |
| 2009/0030865 | A1 * | 1/2009 | Sawada | 706/46 |
| 2009/0144668 | A1 * | 6/2009 | Yeh | 715/863 |

FOREIGN PATENT DOCUMENTS

| | | |
|---|---|---|
| JP | 11-025260 | 1/1999 |
| JP | 2000-222117 | 8/2000 |
| JP | 2002-504722 | 2/2002 |
| JP | 2003-323604 | 11/2003 |

* cited by examiner

*Primary Examiner* — Weilun Lo  
*Assistant Examiner* — Enrique Iturralde  
(74) *Attorney, Agent, or Firm* — Pillsbury Winthrop Shaw Pittman, LLP

(57) ABSTRACT

According to one embodiment, an information processing apparatus is provided with a display section, and can be instructed to be operated by a pointer displayed on the display section, and includes a detection section for detecting, from an input image of a hand, a position of the hand in the image, an operation section for obtaining a probability that the hand exists in the image by using the latest detection result detected by the detection section, and a value of a probability distribution function having a peak at a position which has been evaluated last time as a position at which a probability that the hand exists is high, and a pointer display section for moving the pointer, on the basis of an evaluation value obtained from the probability, to a position at which the probability that the hand exists is the highest and displaying the pointer at the position.

6 Claims, 7 Drawing Sheets

INFORMATION PROCESSING APPARATUS, PROGRAM, AND INFORMATION PROCESSING METHOD

CROSS-REFERENCE TO RELATED APPLICATIONS

This application is based upon and claims the benefit of priority from Japanese Patent Application No. 2007-224369, filed Aug. 30, 2007, the entire contents of which are incorporated herein by reference.

BACKGROUND

1. Field

One embodiment of the present invention generally relates to an information processing apparatus, a program, and an information processing method, and more particularly, to an information processing apparatus, a program, and an information processing method which can recognize a user's gesture, and can perform control based on the recognized gesture.

2. Description of the Related Art

Heretofore, a method of operating an information processing apparatus such as a television receiver or personal computer by giving the apparatus an instruction from a user by means of his or her gesture is proposed. According to such a method, it is possible to remotely control an information processing apparatus without using an input device such as a mouse, keyboard, and a remote controller.

As a method of capturing movements of a gesture or the like, for example, a technique for distinguishing an action or a state of a movement of a subject is proposed (see Jpn. Pat. Appln. KOKAI Publication No. 2003-323604).

The method described in Jpn. Pat. Appln. KOKAI Publication No. 2003-323604 is only a method for detecting that a subject has moved. However, if a cursor is left displayed at the detected position, the cursor is not able to follow the movement of a hand in some cases, which is rather an obstacle to the operation by gesture than a help.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus is provided with a display section, and can be instructed to be operated by a pointer displayed on the display section, and includes a detection section for detecting, from an input image of a hand, a position of the hand in the image, an operation section for obtaining a probability that the hand exists in the image by using the latest detection result detected by the detection section, and a value of a probability distribution function having a peak at a position which has been evaluated last time as a position at which a probability that the hand exists is high, and a pointer display section for moving the pointer, on the basis of an evaluation value obtained from the probability, to a position at which the probability that the hand exists is the highest and displaying the pointer at the position.

An embodiment of the present invention will be described below with reference to the accompanying drawings.

Incidentally, in the embodiment of the present invention, a position of a hand of a user is detected from an image taken by a camera 126, and an operation is performed by moving a pointer such as a cursor to a position corresponding to the position of the hand in the image. A method of controlling a pointer which realizes high operability even when the accuracy in detecting the position of the hand is low, or even when noise causing a misjudgment is present is provided.

Further, the detected position of the hand contains noise information from which it is judged that the detected position of the hand differs from the actual position of the hand, and hence if a pointer is displayed at the detected position of the hand as it is, the position indicated by the pointer includes an error. Then, the instruction of the user is not recognized, and consequently the operability is deteriorated in some cases. When the noise is removed by using a low-pass filter or the like, the larger the noise removal amount becomes, the more difficult it becomes for a change in the display position of the pointer to follow a change in the position of the hand, thereby similarly deteriorating the operability in some cases.

Accordingly, in the present invention, there is provided a control method by which it is possible to reduce an error of the position at which the pointer is displayed when a change in the position of the hand is small, and cause the position at which the pointer is displayed to follow the movements of the hand when a change in the position of the hand is large.

First, an information processing apparatus according to a first embodiment of the present invention will be described below by referring to FIG. 1.

Figure 1:
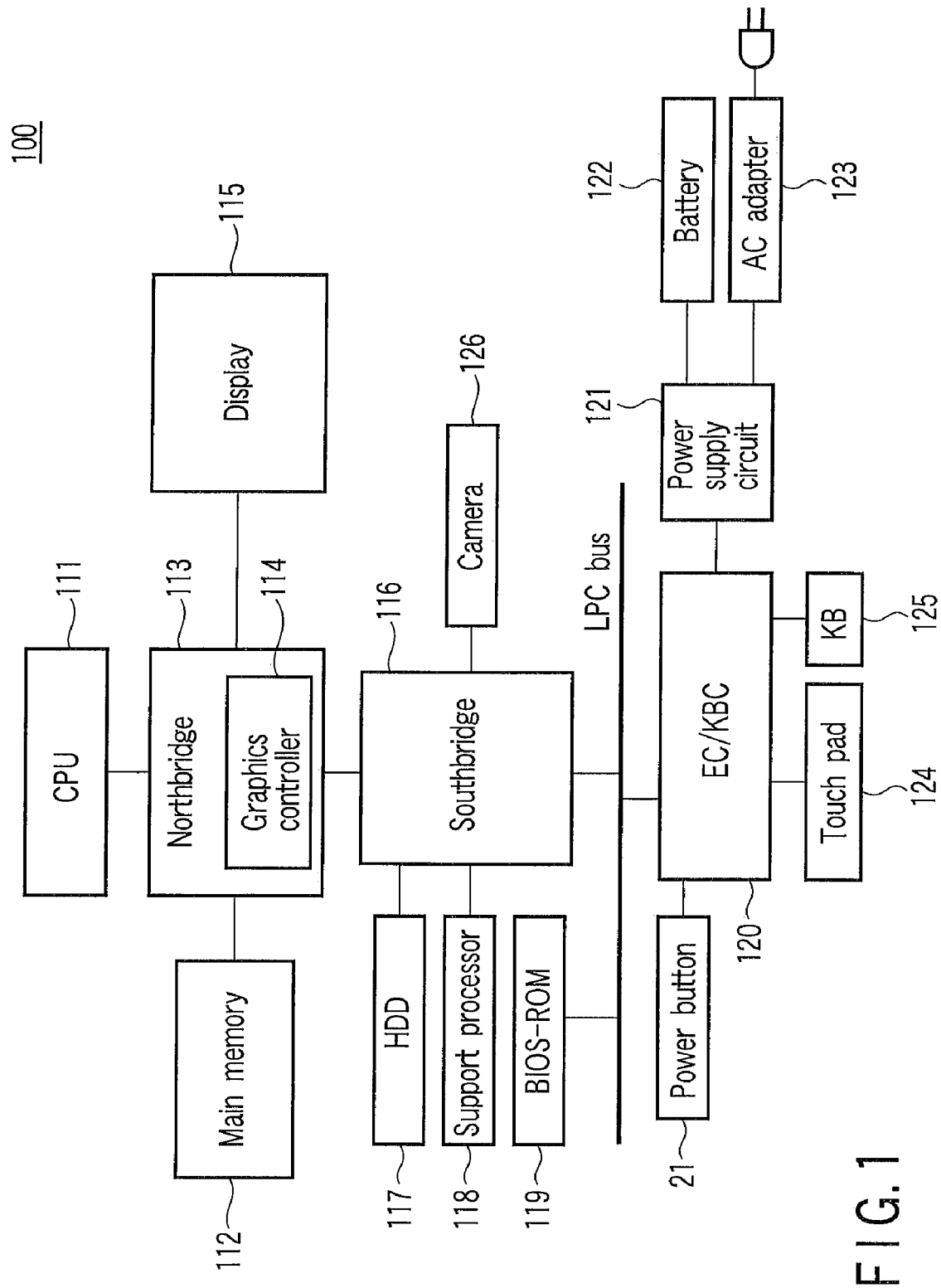
FIG. 1 is an exemplary block diagram schematically showing a configuration example of an information processing apparatus according to an embodiment of the present invention.

FIG. 1 is a block diagram schematically showing a configuration the information processing apparatus according to the first embodiment of the present invention. The information processing apparatus according to this embodiment is realized as, for example, a notebook-sized personal computer.

As shown in FIG. 1, a personal computer 100 is provided with a CPU 111, a main memory 112, a northbridge 113, a graphics controller (display section) 114, a display 115, a southbridge 116, a hard disk drive (HDD) 117, a support processor 118, a BIOS-ROM 119, an embedded controller/keyboard controller IC (EC/KBC) 120, a power supply circuit 121, a battery 122, an AC adapter 123, a touch pad 124, a keyboard (KB) 125, a camera 126, a power button 21, and the like.

The CPU 111 is a processor for controlling an operation of the personal computer 100. The CPU 111 executes an operating system (OS) and various application programs loaded from the HDD 117 into the main memory 112. Further, the CPU 111 also executes a basic input/output system (BIOS) stored in the BIOS-ROM 119. The BIOS is a program for controlling peripheral devices. The BIOS is first executed at the time of turning-on of the power to the personal computer 100.

The northbridge 113 is a bridge device for connecting a local bus of the CPU 111 and the southbridge 116 to each other. The northbridge 113 has a function of executing communication with the graphics controller 114 through an accelerated graphics port (AGP) bus and the like.

The graphics controller 114 is a display controller for controlling the display 115 of the personal computer 100. The graphics controller 114 generates a display signal to be output to the display 115 from display data written to a VRAM (not shown) by the OS or the application program. The display 115 is, for example, a liquid crystal display (LCD).

The HDD 117, support processor 118, BIOS-ROM 119, camera 126, and EC/KBC 120 are connected to the southbridge. Further, the southbridge 116 is provided with an integrated drive electronics (IDE) controller for controlling the HDD 117 and the support processor 118.

The EC/KBC 120 is a one-chip microcomputer in which an embedded controller (EC) for power management and a keyboard controller (KBC) for controlling the touch pad 124 and the keyboard (KB) 125 are integrated with each other. For example, when the power button 21 is operated, the EC/KBC 120 turns on the power of the personal computer 100 in cooperation with the power supply circuit 121. When external power is supplied to the personal computer 100 through the AC adapter 123, the personal computer 100 is driven by the external power. When the external power is not supplied to the personal computer 100, the personal computer 100 is driven by the battery 122.

The camera 126 is, for example, a USB camera. A USB connector of the camera 126 is connected to a USB port (not shown) provided on the main body of the personal computer 100. An image (a position of the hand or the like) taken by the camera 126 is stored in the HDD 117 or the like as frame data. Further, the image can be displayed on the display 115 of the personal computer 100. A frame rate of the image to be supplied by the camera 126 is, for example, 15 frames/sec. The camera 126 may be an external camera or a built-in camera of the personal computer 100.

The support processor 118 performs processing and the like of an animation acquired from the camera 26.

Figure 2:
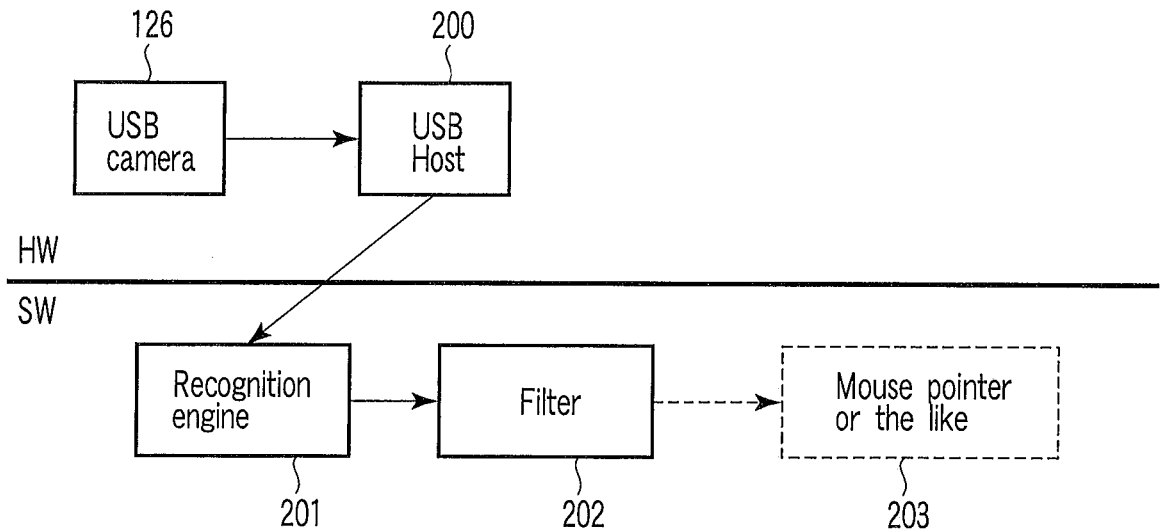
FIG. 2 is an exemplary block diagram showing a part of a configuration of the information processing apparatus.

FIG. 2 is a block diagram showing a part of the configuration of the personal computer 100 in more detail.

As shown in FIG. 2, the personal computer 100 transmits image data acquired from the USB camera 126 to a recognition engine 201 through a USB host 200. The recognition engine 201 recognizes a position or the like of a hand of the user on the basis of the received image data. It is assumed that the recognition engine 201 which recognizes the position or the like of the hand uses various techniques that have been used heretofore (for example, Jpn. PCT National Publication No. 2002-504722 and the like).

Further, positional information of the hand recognized by the recognition engine 201 is subjected to an operation and correction by a filter 202, thereby improving the accuracy such that the positional information approaches the actual position of the hand. When the position of the hand is calculated by the filter 202, a mouse pointer 203 or the like on the display 115 is moved to the calculated position.

Figure 3:
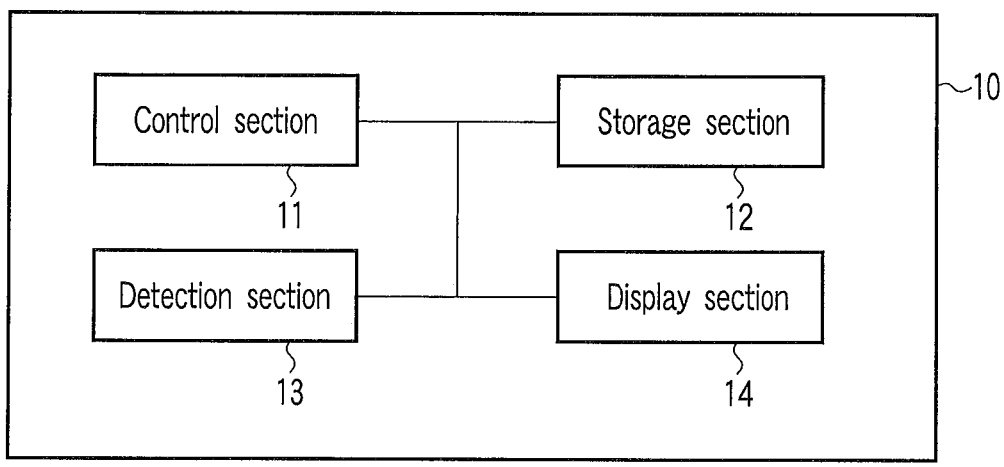
FIG. 3 is an exemplary block diagram showing a functional configuration of the information processing apparatus.

Further, FIG. 3 is a block diagram showing a part of the functional configuration of the personal computer 100. The personal computer 100 is provided with a control section 11, a storage section 12, a detection section 13, and a display section 14. The control section 11 performs processing of the dynamic picture image acquired from the camera 126. The storage section 12 stores various formulas, thresholds, and the like used for judgment (whether or not the image is that of a hand, where the position of the hand is, or the like) on the dynamic picture image. The detection section 13 performs detection on the dynamic picture image (a position or the like of a hand) acquired from the camera 126. The display section 14 displays processing such as a movement or the like of the mouse cursor corresponding to the position of the hand detected by the detection section 13.

Next, the processing for bringing the detected position of the hand closer to the actual position of the hand will be described below in detail with reference to FIGS. 4 to 8. Incidentally, each of FIGS. 5 and 8 is a conceptual view of a processing flow showing an information processing method to which an information processing apparatus according to the embodiment of the present invention is applied.

Assuming that the detected position of the hand follows a normal distribution having the true position of the hand as the center, the pointer is moved in such a manner that the pointer becomes closer to a position at which a probability that the true (actual) position of the hand exists is high.

First, image frame data acquired by the camera 126 is stored in the storage section 12. Past image frame data can be taken out of the storage section 12 to be utilized.

Figure 4:
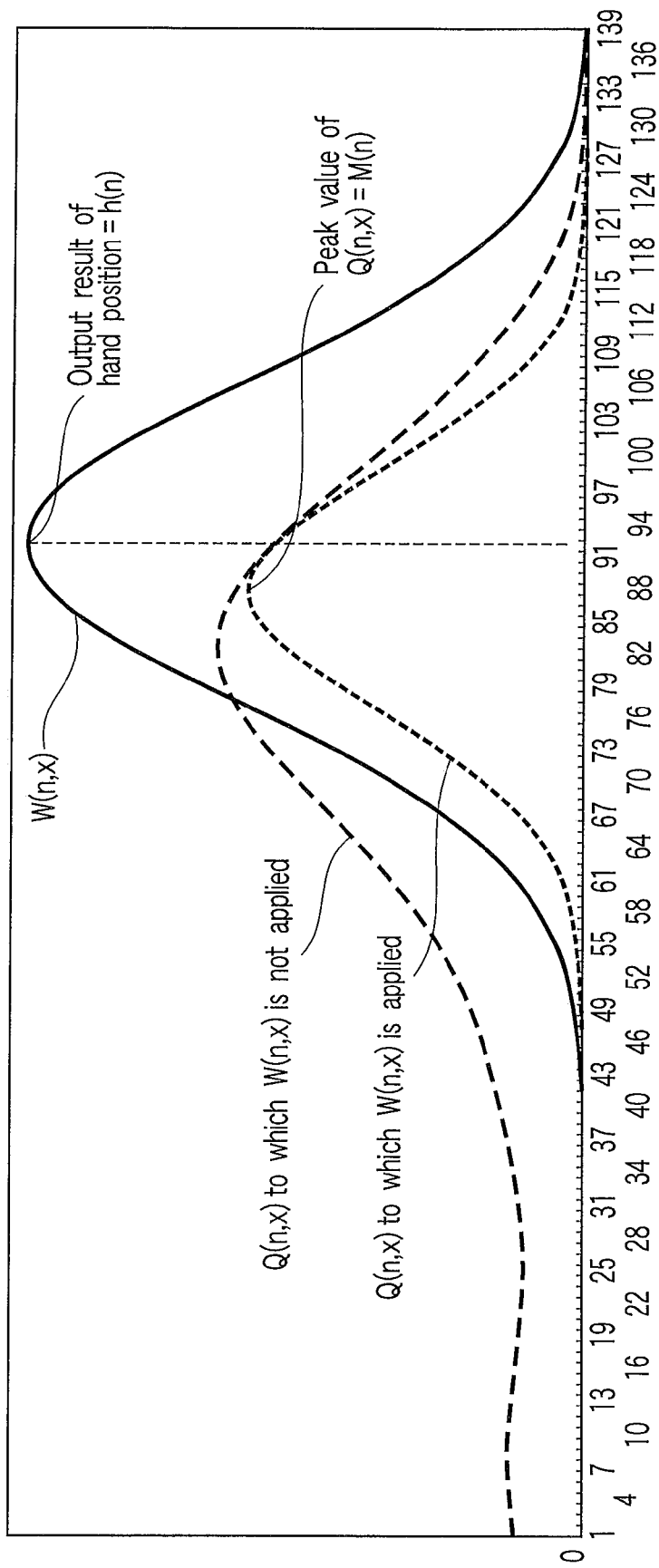
FIG. 4 is an exemplary conceptual view showing effects of Q(n,x) and W(n,x).
Figure 5:
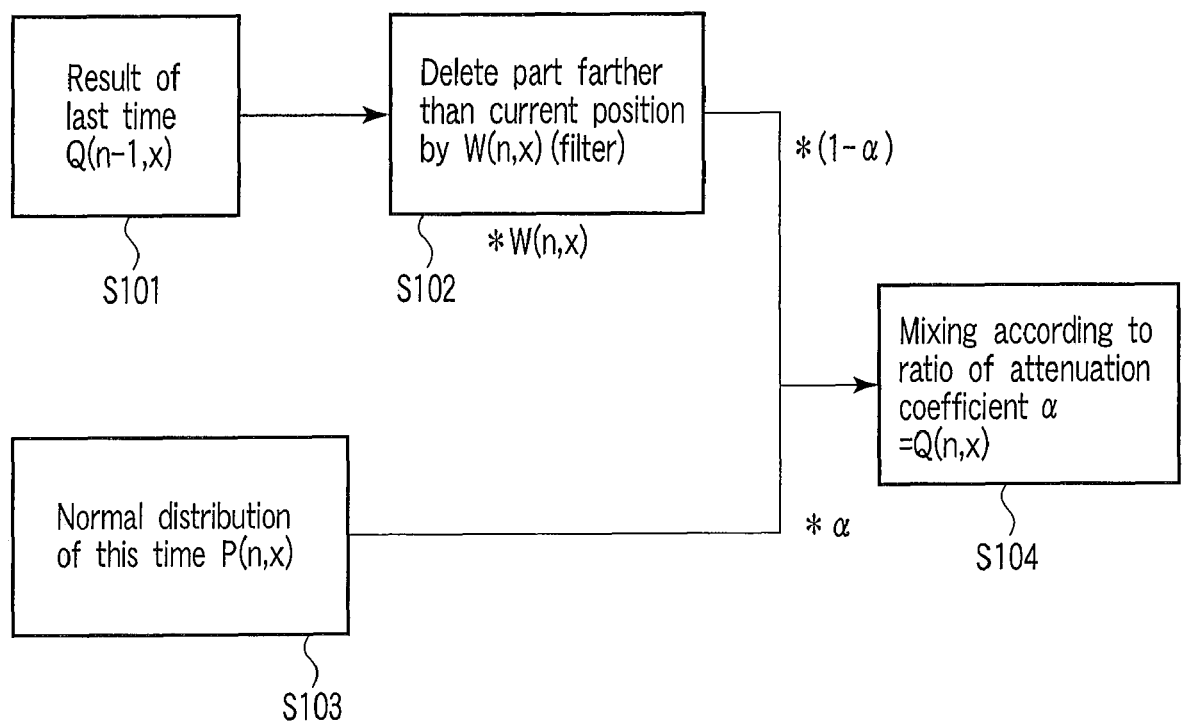
FIG. 5 is an exemplary conceptual view of a processing flow showing an information processing method to which an information processing apparatus according to the embodiment is applied.

At this time, as shown in FIG. 4, it is assumed that a position of a hand detected in the nth frame is h(n), and a pointer position is p(n). A probability P(n,x) that a point x is the true position of the hand when the detected position is h(n) is expressed by the following formula (1) (S103: see FIG. 5).

$$P(n,x)=f(x,h(n),\sigma)$$

where $f(x,\mu,\sigma)$ is a probability density function of the normal distribution, and is expressed by the following formula (2).

$$f(x, \mu, \sigma) = \frac{1}{\sqrt{2\pi}\sigma} \exp\left(-\frac{(x-\mu)^2}{2\sigma^2}\right)$$

where $\mu$ is a mean value, and $\sigma$ is the standard deviation.

A numerical value Q(n,x) expressing the level of the probability that the point x is the true position of the hand is defined by the following formula (3) (S101: see FIG. 5).

$$Q(n,x)=W(n,x)\times Q(n-1,x)\times(1-\alpha)+P(n,x)\times\alpha \quad (1)$$

where $\alpha$ is an attenuation coefficient satisfying the condition $0<\alpha\leq 1$.

W(n,x) is a weight of the past history, and is defined by the following formula (4) (S102: see FIG. 5).

$$W(n, x) = \frac{P(n, x)}{f(h(n), h(n), \sigma)} \quad (2)$$

Incidentally, Q(n−1,x) is past image frame data stored in the storage section 12. Further, $\alpha$ is used as a value of an amount to be caused to reflect the past image frame data.

This formula is obtained by correcting
f(x,h(x), σ) such that the formula becomes 1 when x=h(x). (f(h(n),h(n), σ) is P(n,x) peak value).

When W(n,x) is not present, Q(n,x) becomes the existing probability of the hand caused to reflect the past history by the attenuation coefficient α. Further, by introducing W(n,x) (a function made such that h(n) becomes the peak), it is possible to obtain a characteristic that at a point close to h(n), the current value is moderately approached, and at a point distant from h(n), the value abruptly decreases (S104: see FIG. 5).

Then, at the frame n, the resultant data of the last time is made to be p(n−1) (S201: FIG. 8). Further, weighting is performed by using the value of Q(n,p(n−1)). The closer the point is, the greater the weighting is (S202: FIG. 8). Further, x having the highest Q(n,x) is made to be M(n) (S203: FIG. 8), and the pointer position p(n) is obtained by the following formula (5) (S204: FIG. 8).

$$p(n) = \frac{M(n) \times Q(n, M(n)) + p(n-1) \times Q(n, p(n-1))}{Q(n, M(n)) + Q(n, p(n-1))} \quad (3)$$

The current maximum probability point and the pointer position of the last time are averaged by using the current probability of each point as the weight.

Figure 7:
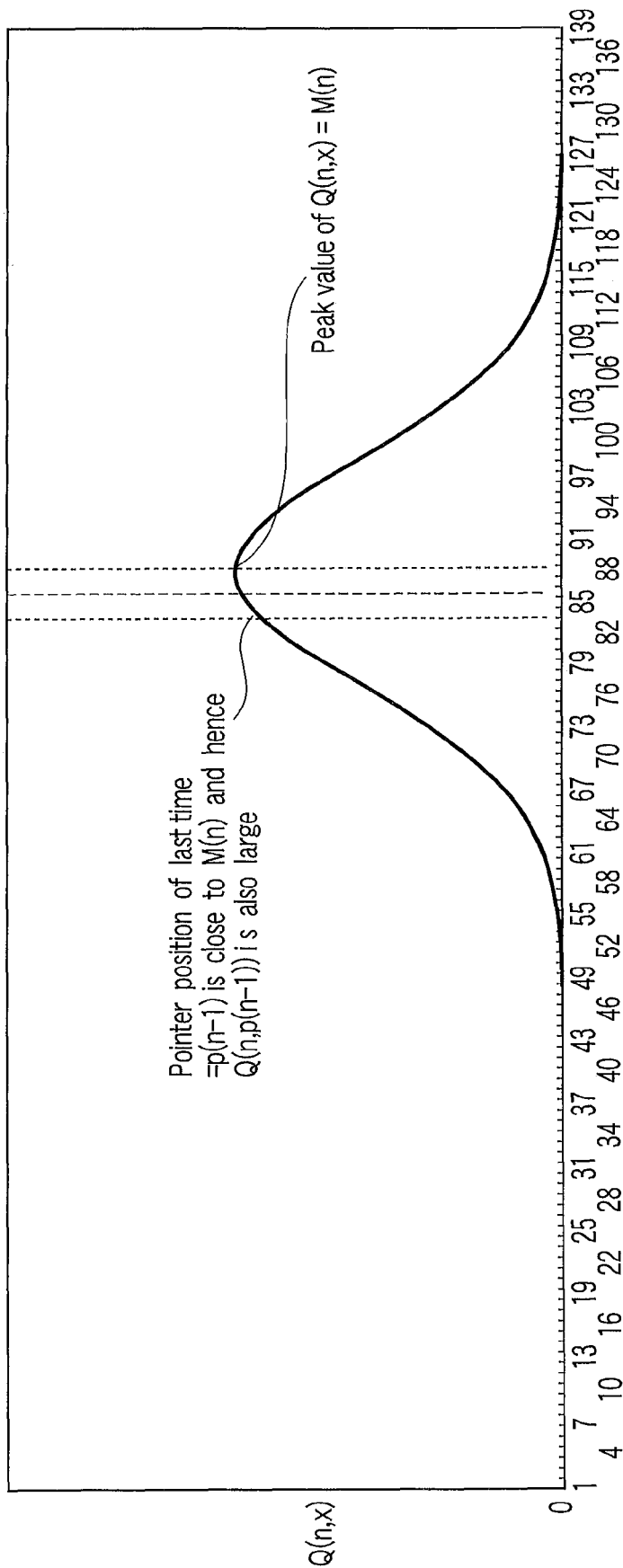
FIG. 7 is an exemplary conceptual view showing a case where Q(n,p(n−1)) is near.
Figure 8:
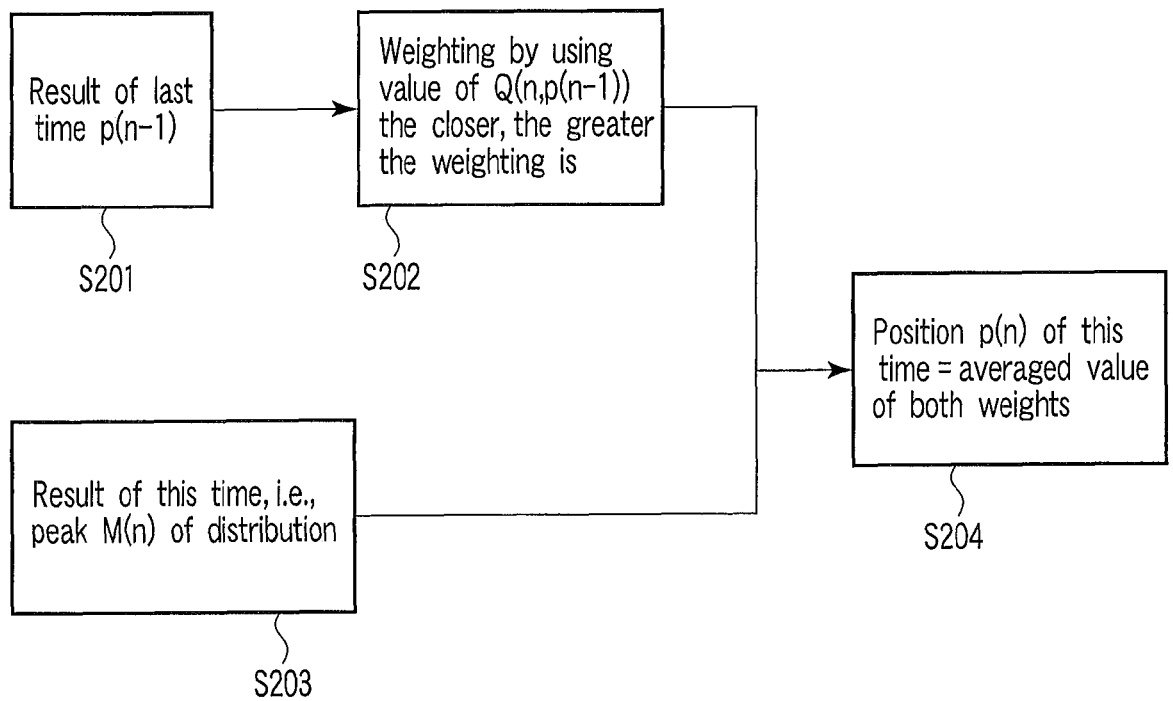
FIG. 8 is an exemplary conceptual view of a processing flow showing an information processing method to which an information processing apparatus according to the embodiment is applied.

When M(n) is close to the pointer position of the last time, Q(n,p(n−1)) also becomes a value close to Q(n,M(n)), and hence the pointer displayed on the display 115 moves slowly (see FIG. 7).

Figure 6:
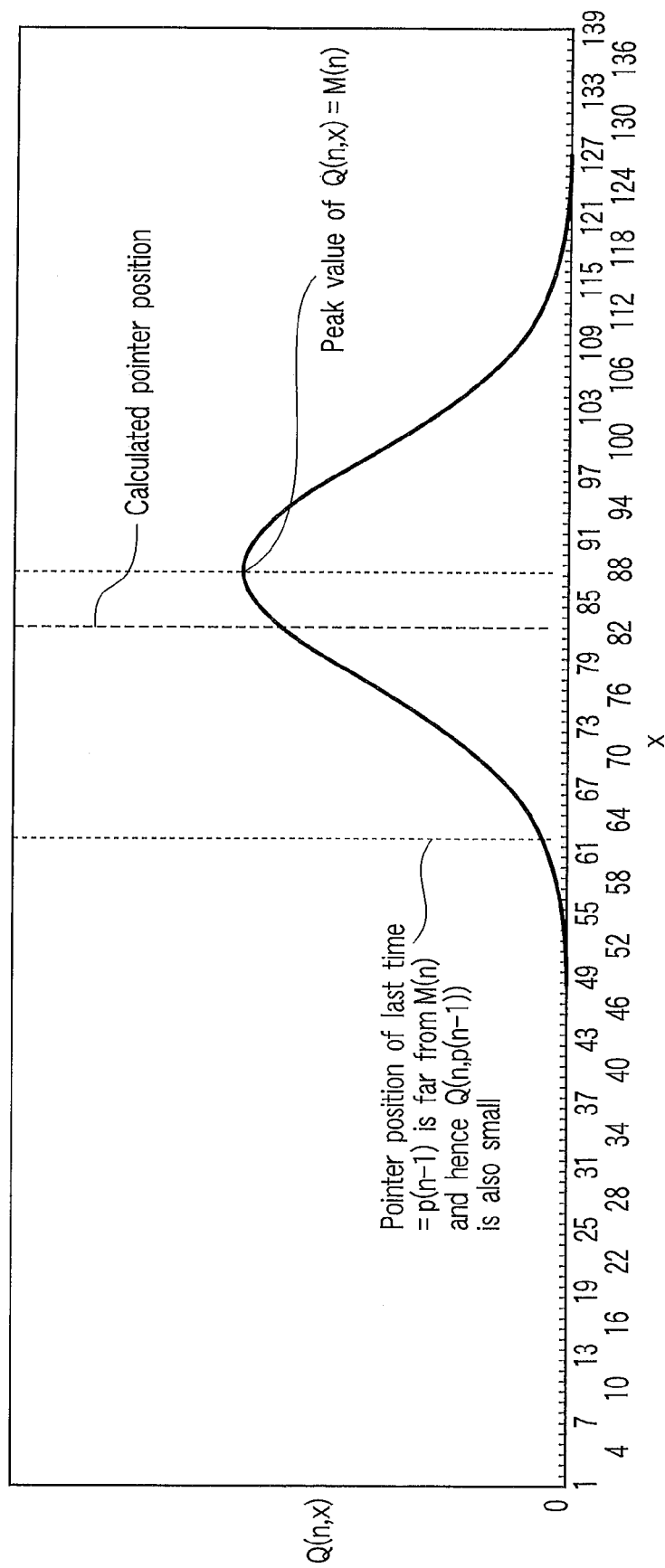
FIG. 6 is an exemplary conceptual view showing a case where Q(n,p(n−1)) is distant.

On the other hand, when M(n) largely differs from the pointer position of the last time, Q(n,p(n−1)), which is the value of the last time, quickly becomes a small value from the formula (1), and hence p(n) rapidly gets closer to M(n) while hardly being reflected (see FIG. 6). Thus, when the position of the hand is largely moved, it is possible to cause the pointer to rapidly approach the current position of the hand.

Further, by introducing a parameter β for controlling the speed of changing the pointer position as shown by the following formula (6), it is also possible to adjust the moving speed of the pointer.

$$p(n) = \frac{M(n) \times Q(n, M(n)) \times \beta + p(n-1) \times Q(n, p(n-1))}{Q(n, M(n)) \times \beta + Q(n, p(n-1))} \quad (4)$$

Thus, an object of the present invention is to provide an information processing apparatus, a program, and an information processing method capable of detecting a position of a hand of a user by a simple configuration, and accurately operating a cursor on the basis of the detected position.

By virtue of this embodiment, when the position of the hand is not moved, it is possible to suppress the shake of the pointer by sharply removing noise at the detection position. Further, when the position of the hand is largely moved (see FIG. 6), it is possible to cause the pointer to rapidly approach the current position of the hand.

Incidentally, the present invention is not limited to the above-mentioned embodiment as it is. The present invention can be concretized in the implementation stage by changing the constituent elements thereof within the scope not deviating from the gist of the invention.

Further, by appropriately combining a plurality of constituent elements disclosed in the above-mentioned embodiment with each other, various inventions can be formed. For example, some constituent elements may be deleted from the entire constituent elements shown in the embodiment. Further, constituent elements of different embodiments may be appropriately combined with each other.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus configured to display a pointer on a display device, comprising:
   a detector to detect, from an input image of a hand, a position of the hand in the image; and
   a processor configured to perform a process for moving the pointer in accordance with a detected position of the hand in the image,
   wherein the processor is configured to calculate a target position of the pointer, based on a weighted average of (1) a first position being a previously calculated target position of the pointer and (2) a second position being a position at which a probability that the hand exists is the highest,
   wherein a first weighting factor for the first position is obtained based on a probability distribution function having a peak at a position at which the probability that the hand exists is the highest and a second weighting factor for the second position is obtained based on the probability distribution function, in which a value of the first weighting factor decreases as a distance between the first position and the second position becomes longer, and the value of the first weighting factor increases and becomes a value close to the second weighting factor as the distance between the first position and the second position becomes shorter, and
   wherein the processor is further configured to move the pointer to the target position.

2. The information processing apparatus according to claim 1, further comprising a camera for shooting an image, wherein
   the detector uses image data acquired from the camera as the input image.

3. A non-transitory computer-readable storage medium having executable instructions for storing a program to be used in an information processing apparatus configured to display a pointer on a display device, the storage medium comprising:
   a detector module configured to detect, from an input image of a hand, a position of the hand in the image; and
   a processor module configured to perform a process for moving the pointer in accordance with a detected position of the hand in the image,
   wherein the processor module is configured to calculate a target position of the pointer, based on a weighted average of (1) a first position being a previously calculated target position of the pointer and (2) a second position being a position at which a probability that the hand exists is the highest,
   wherein a first weighting factor for the first position is obtained based on a probability distribution function having a peak at a position at which the probability that the hand exists is the highest and a second weighting factor for the second position is obtained based on the probability distribution function, in which a value of the first weighting factor decreases as a distance between the first position and the second position becomes longer, and the value of the first weighting factor increases and becomes a value close to the second weighting factor as the distance between the first position and the second position becomes shorter, and wherein the processor module is further configured to move the pointer to the target position.

4. The storage medium according to claim 3, wherein the detector module further includes a procedure for acquiring the input image from a camera.

5. An information processing method of displaying a pointer on a display device, the method comprising:

detecting, from an input image of a hand, a position of the hand in the image;

moving the pointer in accordance with a detected position of the hand in the image;

calculating a target position of the pointer, based on a weighted average of (1) a first position being a previously calculated target position of the pointer and (2) a second position being a position at which a probability that the hand exists is the highest, in which a first weighting factor for the first position being obtained based on a probability distribution function having a peak at a position at which the probability that the hand exists is the highest, the weighting factor for the second position being obtained based on the probability distribution function, and a value of the first weighting factor decreases as a distance between the first position and the second position becomes longer, and the value of the first weighting factor increases and becomes a value close to the second weighting factor as the distance between the first position and the second position becomes shorter, and moving the pointer on the display device to the target position.

6. The information processing method according to claim 5, further comprising, before detecting a position of the hand, acquiring the input image from a camera.

* * * * *